(12) United States Patent
Critsinelis et al.

(10) Patent No.: US 12,297,948 B2
(45) Date of Patent: May 13, 2025

(54) SYSTEMS AND METHODS FOR THERMAL MANAGEMENT OF SUBSEA CONDUITS USING AN INTERCONNECTING CONDUIT AND VALVING ARRANGEMENT

(71) Applicant: Chevron U.S.A. Inc., San Ramon, CA (US)

(72) Inventors: Antonio C.F Critsinelis, Kingwood, TX (US); Sid Mebarkia, Sugar Land, TX (US); Michelle A. Wise, Berkeley, CA (US); Yesudas J. Manimala, Katy, TX (US); William C. Hughes, Houston, TX (US); Steven W. Cochran, Houston, TX (US); Edgar Uribe, Houston, TX (US); Jason D. Garcia, Bellaire, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/489,575

(22) Filed: Oct. 18, 2023

(65) Prior Publication Data

US 2024/0044435 A1 Feb. 8, 2024

Related U.S. Application Data

(63) Continuation of application No. 16/774,718, filed on Jan. 28, 2020, now abandoned.

(51) Int. Cl.
*F16L 53/70* (2018.01)
*E21B 41/00* (2006.01)
(Continued)

(52) U.S. Cl.
CPC .......... *F16L 53/70* (2018.01); *E21B 41/0007* (2013.01); *E21B 43/01* (2013.01); *F16L 1/20* (2013.01)

(58) Field of Classification Search
CPC ......... F16L 53/70; F16L 1/20; E21B 41/0007; E21B 43/01
(Continued)

(56) References Cited

U.S. PATENT DOCUMENTS 3,650,299 A 3/1972 Seiler
5,070,597 A 12/1991 Holt
(Continued)

FOREIGN PATENT DOCUMENTS

GB 2541951 A 10/2015

*Primary Examiner* — Matthew Troutman
*Assistant Examiner* — Patrick F Lambe
(74) *Attorney, Agent, or Firm* — Avery L. Cate

(57) ABSTRACT

Disclosed are systems and methods for thermal management of subsea interconnecting conduit such as jumpers that provide cooling and heat retention of production fluids within the jumpers. In a jumper circuit, parallel sections of jumper are provided having differing amounts of heat transfer between surrounding seawater and production fluids flowing within. Valving is provided to control fluid flow between the parallel sections of jumper, thus controlling the amount of heat transfer between the surrounding seawater and the jumper circuit. A control system can be used to generate an alarm based on fluid temperature and/or fluid flow rate within the jumper circuit indicating the need to adjust the valving to manage the temperature of fluids within the jumper circuit. Changes may be needed particularly depending on the phase of production, e.g., early life, normal operation, shut down and late life operation.

17 Claims, 3 Drawing Sheets

(51) Int. Cl.
*E21B 43/01* (2006.01)
*F16L 1/20* (2006.01)

(58) Field of Classification Search
USPC .......................................................... 137/10
See application file for complete search history.

(56) References Cited

U.S. PATENT DOCUMENTS

| | | | |
|---|---|---|---|
| 6,278,095 | B1 | 8/2001 | Bass |
| 6,742,594 | B2 | 6/2004 | Langford |
| 7,044,228 | B2 | 5/2006 | Langford |
| 8,006,763 | B2 | 8/2011 | Bath |
| 9,920,497 | B2 | 3/2018 | Yermolayev |
| 9,920,597 | B2 * | 3/2018 | Homstvedt ......... F04D 25/0686 |
| 2003/0127148 | A1 | 7/2003 | Watkins |
| 2003/0145997 | A1 | 8/2003 | Langford |
| 2006/0016617 | A1 * | 1/2006 | Corbishley ............. F16L 59/14 |
| | | | 174/137 R |
| 2006/0196568 | A1 | 9/2006 | Leeser |
| 2006/0266523 | A1 | 11/2006 | Lower |
| 2007/0221284 | A1 | 9/2007 | Chenin |
| 2007/0235195 | A1 | 10/2007 | Lawson |
| 2008/0063478 | A1 | 3/2008 | Reddy |
| 2010/0044053 | A1 | 2/2010 | Grimseth |
| 2014/0193205 | A1 | 7/2014 | Parsinejad |
| 2016/0130918 | A1 * | 5/2016 | Bhatnagar ............... E21B 37/00 |
| | | | 137/561 A |
| 2016/0222761 | A1 * | 8/2016 | Cain ..................... E21B 43/017 |
| 2017/0159411 | A1 | 6/2017 | Homstvedt |
| 2017/0175946 | A1 | 6/2017 | Critsinelis |
| 2020/0191317 | A1 | 6/2020 | McBride |
| 2020/0392813 | A1 | 12/2020 | Castello |
| 2021/0180436 | A1 * | 6/2021 | Anres ...................... H05B 6/44 |
| 2022/0034661 | A1 * | 2/2022 | Bishop ................. G01C 21/203 |
| 2023/0052668 | A1 | 2/2023 | Clement |

* cited by examiner

SYSTEMS AND METHODS FOR THERMAL MANAGEMENT OF SUBSEA CONDUITS USING AN INTERCONNECTING CONDUIT AND VALVING ARRANGEMENT

CROSS REFERENCE TO RELATED APPLICATIONS

This application is a Continuation of pending U.S. patent application Ser. No. 16/774,718, filed on Jan. 28, 2020, the entirety of which is incorporated herein by reference.

FIELD

This disclosure relates generally to subsea oil and gas production facilities, and particularly to interconnecting conduits extending between subsea components. The disclosure further relates to thermal management of such interconnecting conduits.

BACKGROUND

The production of hydrocarbons from offshore oil and gas reservoirs requires the transportation of production fluids from the reservoirs to subsea facilities for processing. Three phases, i.e., oil, gas and water, may be included in the production fluids. Subsea developments increasingly must accommodate high temperature production fluids that need to be safely transported to the production facility. The high temperature of the production fluids can have several undesirable effects. Special grade subsea and pipeline materials, extensive qualifications of insulation coating and expensive modifications topsides may be required to handle the high temperature of the product. For instance, water cooled heat exchangers may be used topsides on an offshore platform to reduce the temperature of production fluids, e.g., from around 400° F. to a temperature below 250° F., involving weight, space, cost, etc. In the subsea facility, the high temperature of the product may undesirably result in the occurrence of upheaval buckling, lateral buckling and pipeline walking in flowlines carrying the product. The temperature may also undesirably accelerate corrosion and therefore reduce the life of the flowlines. Attempts have been made at providing a subsea cooling system for use with gas production. No established oil or three phase subsea cooling system is available in the industry.

There exists a need for cost-effective subsea cooling systems and methods that can be applied to subsea flowlines or interconnecting conduits such as jumpers that carry three-phase production fluids to enable the development of high temperature subsea fields without the disadvantages of known systems.

SUMMARY

In general, in one aspect, the disclosure relates to a system for thermal management of a subsea conduit that carries oil and/or gas produced from a subsea well in a subsea production facility located on a seabed. The system includes an interconnecting conduit circuit for carrying production fluids between subsea components. The circuit has two ends for connecting to the subsea components, a first conduit section, and a second conduit section in parallel with respect to one another, wherein the first and second conduit sections have different heat transfer with respect to the surrounding seawater. The system also includes valving to direct the production fluids through the first conduit section and/or second conduit section such that heat transfer from the production fluids to seawater surrounding the interconnecting conduit circuit can be controlled by adjusting the valving.

In another aspect, the disclosure can generally relate to a method for thermal management of the subsea conduit in the subsea production facility. The method includes transmitting production fluids between subsea components in the interconnecting conduit circuit; and controlling the valving to direct the production fluids through the first conduit section and/or second conduit section such that heat transfer from the production fluids to seawater surrounding the interconnecting conduit circuit is adjusted as desired.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
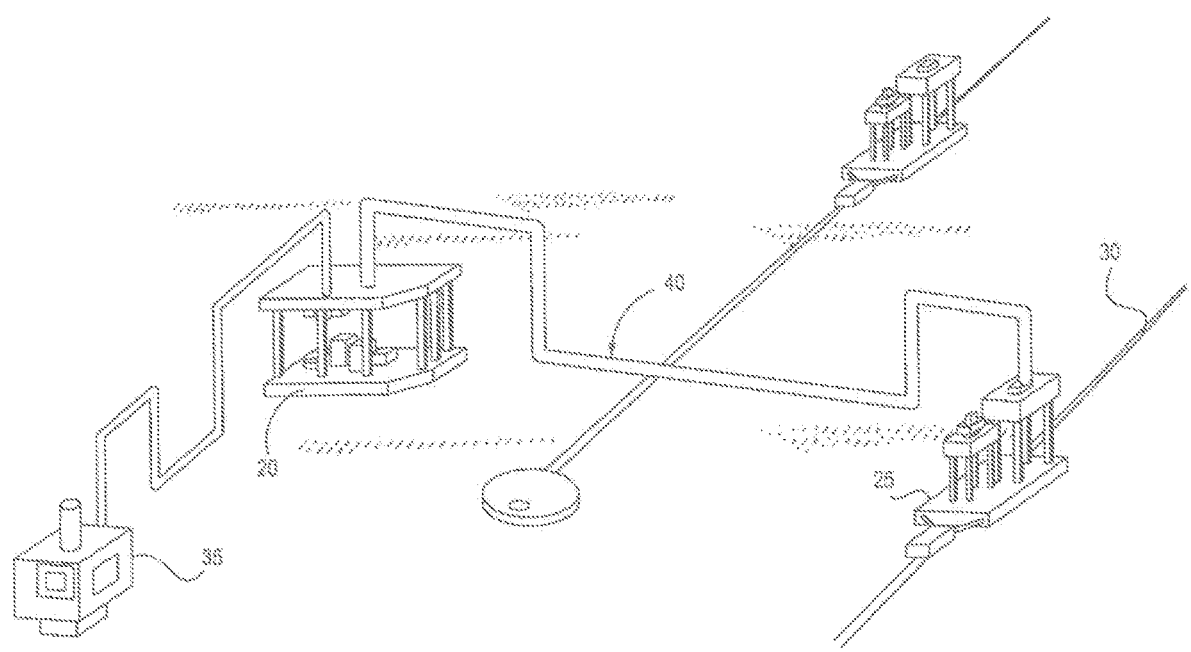
FIG. 1 shows an example embodiment of a subsea interconnecting conduit according to the prior art.

Referring to FIG. 1, a prior art subsea production facility is shown. A subsea pipeline 30 carries oil and/or gas produced from a subsea well 35 in the facility located on the seabed. A jumper 40 is connected to a first subsea component 20 (in this case, a manifold) and a second subsea component 25 (in this case, a pipeline end termination (PLET)). The subsea jumper 40 connects two different structures such as manifold and PLET to allow product flow to or from a subsea pipeline 30. The subsea pipeline 30 is connected to the pipeline end termination. The subsea jumper 40 typically consists of interconnected pipes, connectors, bends and insulation coating. The insulation (not shown) can ensure the product remains flowing above a certain temperature to avoid formation of waxes or hydrates that risk plugging the jumper pipe and stopping production. During shut down when production is stopped, the insulation is used to allow a minimum safe cool down time typically in the range of 12 to 16 hours to avoid formation of waxes of hydrates. As shown, the jumper 40 is shaped with a general M-shape to allow for safe thermal expansion as the temperature of the produced fluids increase through the jumper 40. This helps prevent thermal fatigue of the jumper 40.

Figure 2:
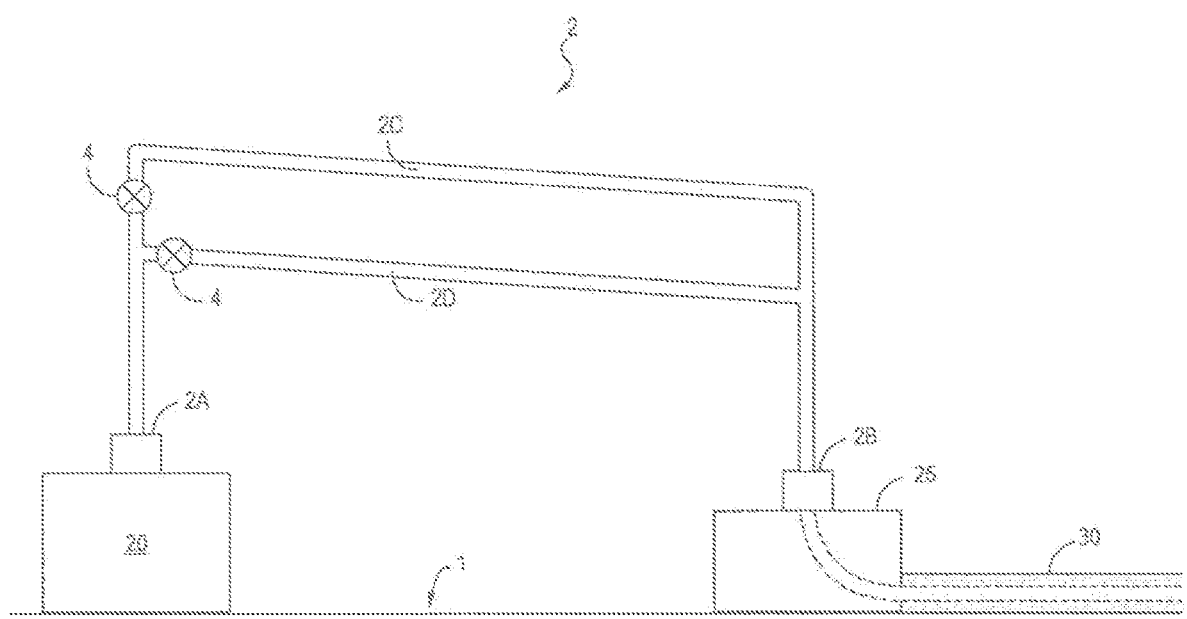
FIG. 2 shows an example embodiment of a self-draining interconnecting conduit circuit having two segments and valving.

In one embodiment, referring to FIG. 2, a system for thermal management of a subsea conduit that carries oil and/or gas produced from a subsea well in a subsea production facility located on a seabed is illustrated. The system includes an interconnecting conduit circuit 2, also referred to herein as a jumper circuit 2, for carrying production fluids between subsea components (e.g., manifolds, wellheads, pipeline end terminations, and other equipment residing on the seabed). The conduit or jumper can be any suitable device as known for permitting the flow of produced fluids therethrough. The jumper circuit 2 has two ends 2A and 2B for connecting to the subsea components (20 and 25). The jumper circuit 2 has a first jumper section 2C and a second jumper section 2D in parallel with respect to one another as shown. The first and second jumper sections 2C and 2D provide differing amounts of heat transfer with respect to the surrounding seawater, i.e., 2C and 2D have different heat transfer coefficients. In one embodiment, one of the first and second jumper sections 2C and 2D is insulated and the other is uninsulated.

Valving 4 is provided to direct the production fluids flowing in the jumper circuit 2 through the first jumper section 2C and/or second jumper section 2D as desired. For example, by adjusting the valving 4, production fluids can be directed solely through section 2C, solely through section 2D, or partially through each of sections 2C and 2D. Since the sections 2C and 2D have differing heat transfer coefficients, the heat transfer from the production fluids to the seawater surrounding the jumper circuit 2 can be controlled by adjusting the valving 4 as desired.

Figure 3:
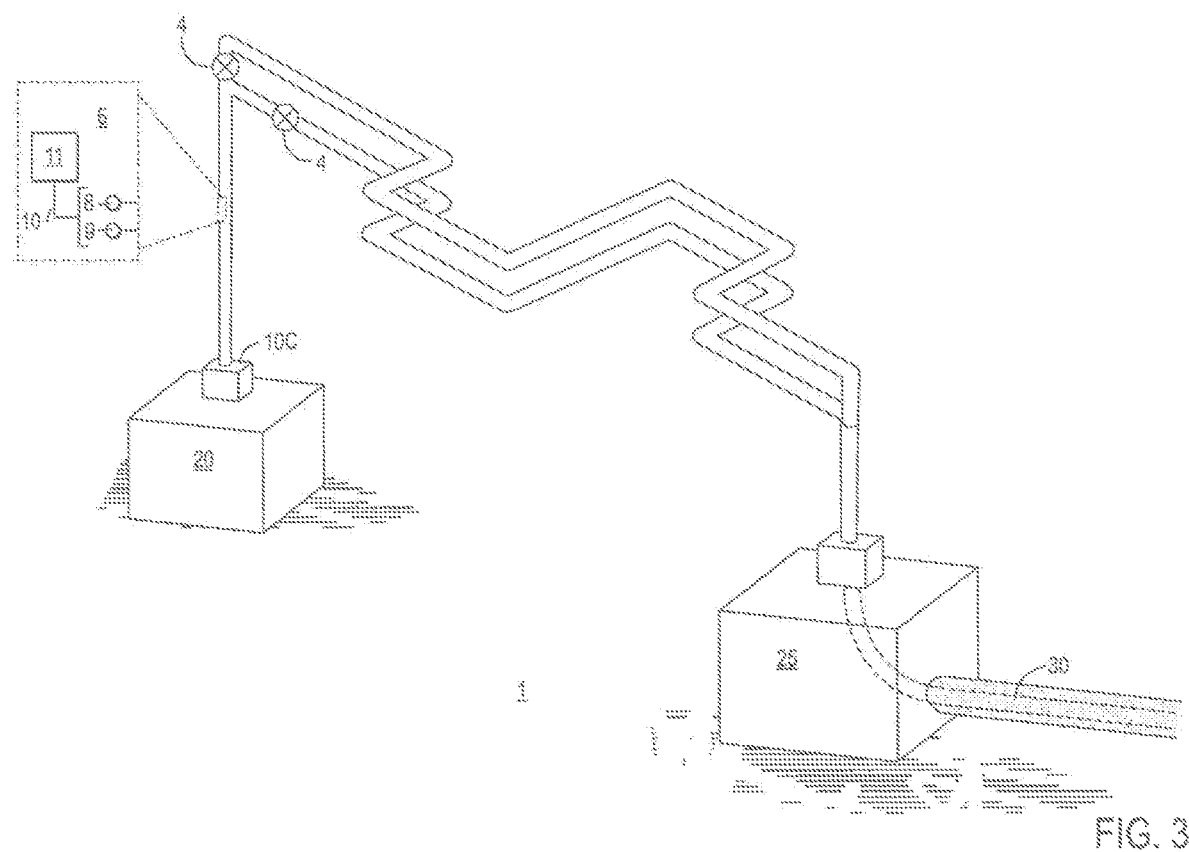
FIG. 3 shows another example embodiment of a self-draining interconnecting conduit circuit having two segments and valving optionally controlled by a control system.

In one embodiment, each of the jumper sections 2C and 2D includes multiple jumper segments changing in direction, e.g., zig-zagging, and sloping downward such that flow of fluid in the jumper segments is assisted by gravity thereby ensuring self-draining of the fluid independent from fluid pressure in the jumper circuit. An example of such a configuration is shown in FIG. 3 where jumper segments 3 in the jumper sections 2C and 2D change direction and slope downward such that flow of fluid in the jumper segments 3. In one embodiment, jumper sections 2C and 2D are positioned at an angle greater than 0 degrees and less than 90 degrees such that the jumper sections 2C and 2D are sloping with respect to the seabed.

In one embodiment, the valving 4 can be controlled responsive to a control system 6 based on a predetermined fluid temperature and/or flow rate of production fluids flowing through the jumper circuit 2. A temperature sensor 8 such as a phase change thermostat, for example, can be used for continuously monitoring an internal fluid temperature of fluid in the jumper circuit 2. A flow rate sensor 9 can be used for continuously monitoring an internal fluid flow velocity of fluid in the jumper circuit 2. A flying lead or umbilical 10 can be used for transmitting temperature and/or flow rate data from the temperature sensor 8 and/or the flow rate sensor 9, respectively, to a processor 11. The processor 11 is configured or set to determine whether to activate an alarm based on the temperature and/or flow rate information. The alarm indicates the need to adjust the valving 4. Operating personnel can act on the alarm by adjusting the valving 4 manually using an ROV. The processor 11 of the control system 6 can also be configured to automatically adjust the valving 4 based on the temperature and/or flow rate information.

In one embodiment, during routine or early-life production of oil and/or gas from a subsea well, the valving 4 is set to direct produced fluid flow through the one of the jumper sections 2C and 2D having the greater amount of heat transfer (i.e., the greater heat transfer coefficient) with respect to the surrounding seawater to aid in cooling of produced fluid in the jumper circuit 2. Likewise, in one embodiment, during shutdown or late-life production from the subsea well, the valving 4 is set to direct produced fluid flow through the one of the jumper sections 2C and 2D having the lesser amount of heat transfer (i.e., the lower heat transfer coefficient) with respect to the surrounding seawater to aid in retaining heat and thus maintaining produced fluid temperature above hydrate formation and wax formation temperatures.

It should be noted that only the components relevant to the disclosure are shown in the figures, and that many other components normally part of a subsea oil and gas field are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A system for thermal management of a subsea conduit that carries oil and/or gas produced from a subsea well in a subsea production facility located on a seabed, comprising:
    an interconnecting conduit circuit for carrying production fluids between subsea components, wherein the interconnecting conduit circuit comprises two ends for connecting to the subsea components, a first conduit section, and a second conduit section in parallel with respect to one another, wherein the first and second conduit sections have different heat transfer with respect to the surrounding seawater;
    valving to selectively direct the production fluids from a first end of the two ends to a second end of the two ends through the first conduit section alone, through the second conduit section alone, or through both the first conduit section and the second conduit section in parallel, such that heat transfer from the production fluids to seawater surrounding the interconnecting conduit circuit can be controlled by adjusting the valving; and
    a temperature sensor for continuously monitoring an internal fluid temperature of fluid in the interconnecting conduit circuit, wherein the valving is controlled responsive to a control system based on the internal fluid temperature detected by the temperature sensor and a predetermined fluid temperature.

2. The system of claim 1 wherein the first conduit section is insulated and the second conduit section is uninsulated.

3. The system of claim 2 wherein each of the first conduit section and the second conduit section include multiple conduit segments changing in direction such that flow of fluid in each of the first conduit section and the second conduit section is assisted by gravity in a downward direction thereby ensuring self-draining of the fluid independent of fluid pressure.

4. The system of claim 1, further comprising a flying lead or umbilical for transmitting temperature data from the temperature sensor to a processor of the control system.

5. The system of claim 1, wherein the control system is capable of being set to automatically activate an alarm indicating a need to adjust the valving based on the internal fluid temperature reaching the predetermined fluid temperature.

6. The system of claim 1, wherein the control system is capable of being set to automatically adjust the valving based on the internal fluid temperature reaching the predetermined fluid temperature.

7. The system of claim 1, wherein the temperature sensor comprises a phase change thermostat for continuously monitoring the internal fluid temperature of the fluid in the interconnecting conduit circuit.

8. The system of claim 1 wherein the interconnecting conduit circuit is positioned at an angle greater than 0 degrees and less than 90 degrees such that the first conduit section and the second conduit section are both sloping with respect to the seabed.

9. The system of claim 1, wherein the first conduit section and the second conduit section are located one above the other in a vertical direction.

10. A method for thermal management of a subsea conduit that carries oil and/or gas produced from a subsea well in a subsea production facility located on a seabed, comprising:
transmitting production fluids between subsea components in an interconnecting conduit circuit comprising:
two ends for connecting to the subsea components; and
a first conduit section and a second conduit section in parallel with respect to one another, wherein the first and second conduit sections have different heat transfer with respect to the surrounding seawater;
monitoring an internal fluid temperature of fluid in the interconnecting conduit circuit via a temperature sensor; and
controlling valving to selectively direct the production fluids from a first end of the two ends to a second end of the two ends through the first conduit section alone, through the second conduit section alone, or through the first conduit section and the second conduit section in parallel, such that heat transfer from the production fluids to seawater surrounding the interconnecting conduit circuit is adjusted, wherein the valving is controlled responsive to a control system based on the internal fluid temperature detected by the temperature sensor and a predetermined fluid temperature.

11. The method of claim 10 wherein the first conduit section is insulated and the second conduit section is uninsulated.

12. The method of claim 11 wherein each of the first conduit section and the second conduit section include multiple conduit segments changing in direction such that flow of fluid in each of the first conduit section and the second conduit section is assisted by gravity in a downward direction thereby ensuring self-draining of the fluid independent of fluid pressure.

13. The method of claim 10, further comprising transmitting temperature data from the temperature sensor to a processor of the control system via a flying lead or umbilical.

14. The method of claim 10, wherein the control system is set to automatically activate an alarm indicating a need to adjust the valving based on the internal fluid temperature reaching the predetermined fluid temperature.

15. The method of claim 10, wherein the control system is set to automatically adjust the valving based on the internal fluid temperature reaching the predetermined fluid temperature.

16. The method of claim 10 wherein during routine or early-life production of oil and/or gas from the subsea well, the valving directs produced fluid flow through the one of the first and second conduit sections having greater heat transfer with respect to the surrounding seawater to aid in cooling of produced fluid; and during shutdown or late-life production of oil and/or gas from the subsea well, the valving directs produced fluid flow through the one of the first and second conduit sections having less heat transfer with respect to the surrounding seawater to aid in maintaining produced fluid temperature above hydrate formation and wax formation temperatures.

17. The method of claim 10 wherein the interconnecting conduit circuit is positioned at an angle greater than 0 degrees and less than 90 degrees such that the first conduit section and the second conduit section are both sloping with respect to the seabed.

* * * * *